US012453850B2

(12) United States Patent
Mohl et al.

(10) Patent No.: US 12,453,850 B2
(45) Date of Patent: Oct. 28, 2025

(54) BLOOD PUMP FOR SUPPORTING CARDIAC PERFORMANCE

(71) Applicant: Werner Mohl, Altenmarkt/Thennenberg (AT)

(72) Inventors: Werner Mohl, Altenmarkt-Thennenberg (AT); Gerd Siekmeyer, Kiel (DE)

(73) Assignee: Werner Mohl, Altenmarkt/Thennenberg (AT)

( * ) Notice: Subject to any disclaimer, the term of this patent is extended or adjusted under 35 U.S.C. 154(b) by 0 days.

(21) Appl. No.: 18/844,082

(22) PCT Filed: Mar. 18, 2022

(86) PCT No.: PCT/IB2022/052465
§ 371 (c)(1),
(2) Date: Sep. 5, 2024

(87) PCT Pub. No.: WO2023/175380
PCT Pub. Date: Sep. 21, 2023

(65) Prior Publication Data
US 2025/0128048 A1 Apr. 24, 2025

(30) Foreign Application Priority Data
Mar. 14, 2022 (AT) .................................. A 65/2022

(51) Int. Cl.
A61M 60/148 (2021.01)
A61M 60/122 (2021.01)
(Continued)

(52) U.S. Cl.
CPC ........ A61M 60/569 (2021.01); A61M 60/122 (2021.01); A61M 60/226 (2021.01);
(Continued)

(58) Field of Classification Search
CPC .. A61M 60/13; A61M 60/148; A61M 60/237; A61M 60/414; A61M 2205/04;
(Continued)

(56) References Cited

U.S. PATENT DOCUMENTS

2002/0123661 A1 9/2002 Verkerke et al.
2003/0187322 A1 10/2003 Siess
(Continued)

OTHER PUBLICATIONS

International Search Report and Written Opinion received in PCT/IB2022/052465 dated Dec. 12, 2022, pp. 13.
(Continued)

Primary Examiner — Jon Eric C Morales
(74) Attorney, Agent, or Firm — Liang & Hennessey LLP; Brian Hennessey

(57) ABSTRACT

In a blood pump for supporting cardiac performance, including a stent-like housing which has a first axial end and a second axial end, a pump rotor mounted rotatably in the housing, in particular an impellor, and a flexible drive shaft, which can be coupled to a motor in order to drive the pump rotor to rotate, whereby blood is sucked in on an intake side of the pump rotor through an intake tube of the blood pump and is ejected on a discharge side of the pump rotor, the blood pump has a flow directing means arranged downstream of the pump rotor in order to selectively direct the blood conveyed by the pump rotor to the first or to the second axial end of the housing while maintaining the direction of rotation of the pump rotor.

15 Claims, 4 Drawing Sheets

(51) Int. Cl.
  *A61M 60/13*   (2021.01)
  *A61M 60/205*  (2021.01)
  *A61M 60/226*  (2021.01)
  *A61M 60/414*  (2021.01)
  *A61M 60/515*  (2021.01)
  *A61M 60/569*  (2021.01)
  *A61M 60/812*  (2021.01)
  *F04D 29/18*   (2006.01)

(52) U.S. Cl.
  CPC ........ *A61M 60/414* (2021.01); *A61M 60/515* (2021.01); *A61M 60/812* (2021.01); *A61M 2205/0216* (2013.01); *A61M 2205/103* (2013.01); *A61M 2205/3327* (2013.01); *A61M 2205/3331* (2013.01); *A61M 2205/50* (2013.01); *A61M 2206/10* (2013.01); *A61M 2230/04* (2013.01)

(58) Field of Classification Search
  CPC .......... A61M 2210/125; A61M 60/135; A61M 60/17; A61M 60/205; A61M 60/405; A61M 60/419; A61M 60/422; A61M 60/523; A61M 60/81; A61M 60/833; A61M 60/861; A61M 60/896; F04D 13/027; F04D 15/0005; F04D 29/026; F04D 29/18; F04D 29/181; F04D 29/247; F04D 29/528; F05D 2300/174; F05D 2300/505; F05D 2300/603; F05D 2300/6034
  See application file for complete search history.

(56) References Cited

U.S. PATENT DOCUMENTS

2009/0093796 A1   4/2009  Pfeffer et al.
2020/0405926 A1  12/2020  Alexander et al.
2021/0199120 A1*  7/2021  Bredenbreuker ... F04D 15/0005

OTHER PUBLICATIONS

Office Action in Austrian Application No. A 65/2022, mailed Oct. 21, 2022, 5 pages.

* cited by examiner

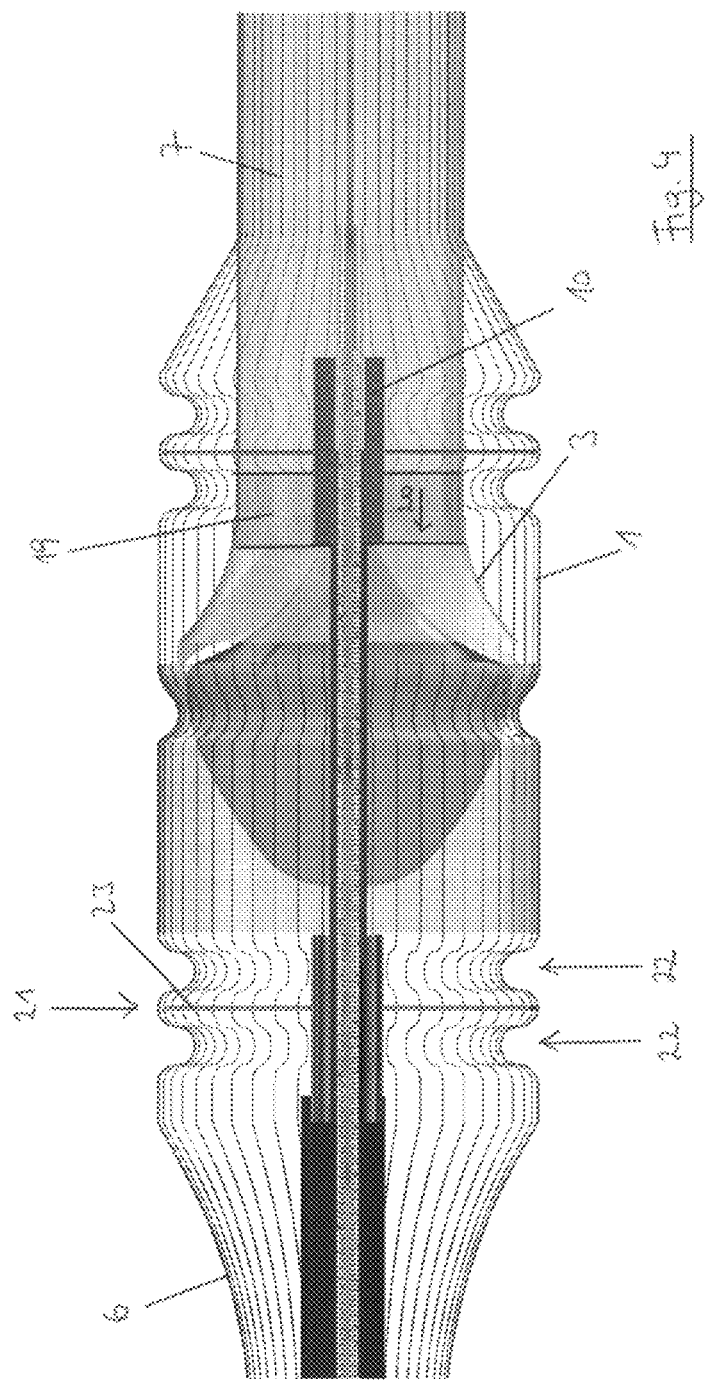

BLOOD PUMP FOR SUPPORTING CARDIAC PERFORMANCE

CROSS-REFERENCE TO RELATED APPLICATIONS

The present application is a national phase application of PCT Application No. PCT/IB2022/052465, filed Mar. 18, 2022, entitled "BLOOD PUMP FOR SUPPORTING CARDIAC PERFORMANCE", which claims the benefit of Austrian Patent Application No. A 65/2022, filed Mar. 14, 2022, each of which is incorporated by reference in its entirety.

BACKGROUND OF THE INVENTION

1. Field of the Invention

The invention relates to a blood pump for supporting cardiac performance.

2. Description of the Related Art

Blood pumps to support cardiac performance are used for temporary mechanical support of cardiac activity in acute cardiac conditions, such as heart failure, heart attack or chronic heart failure, and are used to avoid cardiogenic shock or aid hemodynamic stabilization in cardiogenic shock.

Intra-aortic balloon pumps have already been proposed to support cardiac activity during a percutaneous coronary intervention. Intra-aortic balloon pumps comprise a balloon catheter, which is placed below the left subclavian artery and above the outflow of the renal arteries in the descending aorta, and an extracorporeal pump with a control unit. The pump inflates the balloon of the balloon catheter in diastole and fully deflates the balloon immediately before the onset of systole.

Intra-aortic balloon pumps are used for intra-aortic counterpulsation. Intra-aortic counterpulsation is achieved by inflating and deflating the balloon and the resulting change in pressure conditions within the aorta. In the inflated state, the balloon prevents blood flow in the direction of the lower half of the body, which increases the diastolic aortic pressure and increases blood flow in the direction of the upper half of the body and the heart (so-called diastolic augmentation). Diastolic augmentation leads to an improvement in coronary and cerebral circulation during diastole. Active deflation of the balloon immediately before systole releases blood flow towards the lower half of the body, decreasing end-diastolic and systolic aortic pressure. During systole, the decreased pressure in the aorta leads to a decrease in intra-aortic resistance, a decrease in left ventricular afterload and an associated increase in cardiac output, as well as relief of the myocardium.

The disadvantage of intra-aortic balloon pumps according to the prior art is that intra-aortic counterpulsation only causes a relatively small increase in cardiac output.

To support cardiac activity during a percutaneous coronary intervention, small axial pumps have also been proposed (so-called percutaneous ventricular assist devices, PVAD), which are inserted via an arterial vessel and pushed forward to the heart. The pump is arranged such that the blood in the left ventricle is received by the pump and pumped into the ascending aorta. The pump is operated continuously, i.e. independently of the cardiac cycle, which results in a volume-dependent relief of the left ventricle. With increasing pumping power, the left ventricle is increasingly relieved, resulting in a decrease in left ventricular end-diastolic pressure, LV (left ventricle) work, and myocardial oxygen demand. In addition, the higher degree of relief leads to an increased dissociation of peak LV pressure and aortic pressure, referred to as ventriculo-arterial decoupling.

Unlike intra-aortic balloon pumps, however, such axial pumps are not readily suitable for improving coronary circulation.

A particular challenge is the percutaneous coronary intervention in high-risk patients, so-called CHIP ("complex high-risk and indicated patients"). Such high-risk patients are defined by a number of characteristics, including complex coronary heart disease (CHD, multivessel or left heart disease, and anatomically complex coronary lesions), hemodynamic status (severely impaired LV function), and clinical comorbidities such as advanced age, diabetes, peripheral vascular disease, heart failure, acute coronary syndromes, or prior cardiac surgery. In particular, this is a patient group in which the blood flow to the heart is temporarily impaired by the intervention and can even be interrupted in the event of a complication.

SUMMARY OF THE INVENTION

The present invention therefore aims to combine the advantages of an intra-aortic balloon pump with those of the axial pump so that both intra-aortic counterpulsation and increased ejection performance can be achieved to reduce complications in the percutaneous coronary intervention of high-risk patients.

To achieve this object, the blood pump for supporting cardiac performance according to the invention comprises a stent-like housing, which has a first axial end and a second axial end, a pump rotor, in particular an impellor, rotatably mounted in the housing, and a flexible drive shaft, which can be coupled to a motor, in order to drive the pump rotor to rotate, as a result of which blood is sucked in on a intake side of the pump rotor through a intake tube of the blood pump and is ejected on an discharge side of the pump rotor, the blood pump having a flow directing means arranged downstream of the pump rotor in order to guide the blood conveyed by the pump rotor selectively to the first or to the second axial end of the housing while maintaining the direction of rotation of the pump rotor.

The blood pump according to the invention is placed, for example, in the descending aorta, wherein the intake side, i.e. the first axial end of the housing, is positioned in the immediate vicinity of the left subclavian artery and the discharge side, i.e. the second axial end of the housing, is positioned distally of the left subclavian artery. The intake tube of the pump protrudes beyond the first axial end of the housing and extends at least into the aortic arch, the suction opening of the intake tube being positioned in the ascending aorta or in the left ventricle.

Alternatively, the blood pump according to the invention can also be positioned, for example, in such a way that the intake side of the pump is positioned in the left ventricle and the discharge side of the pump is positioned in the ascending aorta.

The provision of a flow directing means, which guides the blood conveyed by the pump rotor selectively to the first or to the second axial end of the housing while maintaining the direction of rotation of the pump rotor, enables, on the one hand, the effect of an intra-aortic counterpulsation when the direction of ejection is changed accordingly and, on the other hand, an increase in the cardiac output due to the pumping effect. This combines the advantages of an intra-aortic balloon pump with those of the axial pump.

A structurally advantageous embodiment of the blood pump provides that the impellor has an inner impellor body, which carries a multitude of impellor blades and is surrounded by a substantially conical impellor casing in such a way that, between the impellor casing and the impellor body, an annular flow channel is formed which widens radially outwards in the direction of flow from the intake side to the discharge side, in which the impellor blades are arranged, wherein the intake tube is connected to the impellor casing on the intake side and the flow channel has an annular opening on the discharge side, the outer edge of which is formed by the impellor casing and the inner edge of which is formed by the impellor body, and wherein the housing comprises the inwardly protruding flow directing means, which interacts selectively with the inner or the outer edge of the annular opening, in order to guide the blood emerging from the flow channel of the impellor either to the first or to the second axial end of the housing.

When the impellor of the blood pump according to the invention is rotated, the blood is sucked out of the left ventricle via the intake tube and flows into the flow channel located between the impellor casing and the impellor body. The impellor positioned in the flow channel ejects the blood via the annular opening of the flow channel, wherein a downstream flow directing means is designed according to the invention in such a way that it guides the blood flow either to the first or to the second axial end of the housing, depending on the setting.

If the flow directing means is arranged to cooperate with the outer edge of the annular opening, the blood flows in the direction of the second axial end of the housing. This leads to blood flow in the direction of the lower half of the body, which lowers the end-diastolic and systolic aortic pressure in the sense of intra-aortic counterpulsation similar to the use of an intra-aortic balloon pump. The lowered pressure in the aorta leads to a decrease in the left ventricular afterload and an associated increase in cardiac output, as well as relief of the myocardium. By adjusting the rpm of the impellor, the aforementioned effect can be adapted to the respective needs.

If the flow directing means is positioned to cooperate with the inner edge of the annular opening, the blood is diverted in the opposite direction and thus flows in the direction of the first axial end of the housing. In this case, the pump according to the invention promotes blood flow from the left ventricle in the direction of the upper half of the body, as a result of which the diastolic aortic pressure increases, which in turn leads to an improvement in cerebral and coronary blood flow during diastole. This effect can be individually adjusted by adjusting the pump rpm.

Accordingly, the blood pump according to the invention enables both an acceleration of the blood flowing from the heart and an associated increase in ejection performance, as well as intra-aortic counterpulsation.

The pump rotor, in particular the impellor, is driven via a flexible drive shaft, which can be coupled to a drive motor. The motor is preferably positioned extracorporeally. Optionally, only the impellor body carrying the impellor blades or the impellor body can be set in rotation together with the impellor casing.

The stent-like housing can preferably be built as a substantially cylindrical wire mesh, which can be coated or sheathed at least in an axial subregion in order to be impermeable to blood in the relevant subregion. In this case, the sheathing or coating is preferably provided in the region of the impellor, in particular before and after the flow directing means, in order to ensure that a defined flow cross section is provided for the blood flowing either to the first end or to the second end of the housing. Outside of said axial subregion, a coating or sheathing can preferably be dispensed with, so that the region of the pump surrounded by the housing is fluidically connected to the volume of the blood vessel, i.e. the aorta, lying radially outside of it.

The intake tube opening into the flow channel between the impellor body and the impellor casing can also be designed as a coated or sheathed wire mesh in order to achieve sufficient flexibility, which allows a curved arrangement in the aortic arch.

Materials suitable for coating include, for example, polyethylene, PC, PET, PTFA and polyurethane.

The impellor blades can preferably be formed from a metal-polymer combination.

The impellor body can preferably be designed as a balloon, wherein the impellor blades are arranged on the side of the balloon facing the impellor casing.

Various constructive configurations are conceivable for the above-described change in the direction of flow with the aid of the flow directing means. According to a first embodiment of the invention, the blood pump is preferably further developed in such a way that the flow directing means is held displaceably between a first and a second position, wherein the flow directing means in the first position interacts with the outer edge of the annular opening and in the second position interacts with the inner edge of the annular opening.

For this purpose, the flow directing means can be designed, for example, as an annular movable valve, the first end of which is attached to the inside of the housing near the annular opening by means of an actuator-driven joint, and the second end of which protrudes radially inward from the housing in the direction of the impellor. Depending on which direction of flow of blood is desired, the valve is moved toward the inner or outer edge of the annular opening.

When the second end of the valve abuts the outer edge of the annular opening, i.e. the impellor casing, the blood flows through the annular opening of the flow channel in the direction of the second axial end of the housing and from there reaches the lower half of the body. When the second end of the valve abuts the inner edge of the annular opening, i.e., the impellor body, the blood impinges on the valve as it flows out of the flow channel and is directed toward the first axial end of the housing, creating retrograde blood flow toward the upper half of the body.

The flow directing means can preferably be formed by an annular, flexible lip, wherein a preferably pneumatically or hydraulically actuatable actuating member is provided, which interacts with the flow directing means in order to displace the latter between the first and the second position.

The annular, flexible lip may be configured, for example, as a U-shaped indentation of the housing in the longitudinal section of the housing. In such a configuration, the pneumatically or hydraulically actuatable actuating member can be accommodated in the indentation in such a way that it runs around the outside of the housing.

In this case, the pneumatically or hydraulically actuatable actuating member can be formed by an annular hollow body which is supplied with gas or liquid by a gas supply or liquid supply and, if gas or liquid is supplied, and the annular hollow body which runs in the indentation surrounding the outer side of the housing is filled with gas or liquid, the inner diameter of the housing indentation is reduced, as a result of which the latter comes into contact with the impellor body and ensures that the blood flow is diverted in the direction of the first end of the housing.

If gas or liquid is drained, i.e. the volume of the hollow body is reduced, the inner diameter of the housing indentation widens, so that it comes into contact with the impellor casing, whereby the blood flow is directed towards the second end of the housing.

According to a second embodiment of the invention, the blood pump is preferably further developed in such a way that the impellor is slidably supported in the axial direction of the housing between a first and a second position, wherein the flow directing means in the first position interacts with the outer edge of the annular opening and in the second position interacts with the inner edge of the annular opening.

The flow directing means is immovably attached to the inside of the housing near the annular opening and protrudes radially into the interior of the housing in the direction of the impellor. In order to conduct the blood in the direction of the first axial end or the second axial end, the impellor is arranged so as to be axially displaceable in the direction of the first or the second axial end of the housing.

If the impellor is displaced in the direction of the first axial end of the housing, the flow directing means rests against the impellor body, i.e. the flow directing means interacts with the inner edge of the annular opening, as a result of which the blood is guided in the direction of the heart.

If the impellor is displaced in the direction of the second axial end of the housing, the flow directing means rests against the impellor casing, i.e. the flow directing means interacts with the outer edge of the annular opening, as a result of which the blood is guided in the direction of the lower half of the body.

According to the invention, it is provided that the intake tube of the pump is connected to the impellor casing on the intake side. In order to reduce the tensile force acting on the intake tube and to enable displacement of the impellor relative to the intake tube, it is preferably provided that the intake tube and the impellor casing are connected to one another so as to be displaceable in the axial direction of the housing.

For example, the intake tube can be provided with a telescopic connection for this purpose, which can be extended in the axial direction of the pump, whereby the displacement of the impellor in the direction of the second axial end of the pump is assisted and the tensile force acting on the intake tube after the displacement is substantially reduced.

In order to enable an axial displacement of the impellor in the direction of the second axial end of the pump, the intake tube can alternatively also be spring-mounted.

The telescopic connection is preferably positioned distally to the first axial end of the housing, in the immediate vicinity of the widening end of the impellor casing.

In order to fix and stabilize the flexible drive shaft in the housing of the blood pump, it is preferably rotatably held on both sides of the impellor in a bearing that is fastened to the housing by means of a radial strutting. In this case, the radial strutting can optionally be designed to be rigid or axially resilient.

The radial strutting extends from the outer side of the bearing facing the inner side of the housing in the direction of the inner side of the housing, so that the radial strutting comes to rest on the inner side of the housing. This achieves a support of the drive shaft on the housing, where the radial strutting can be held in an annular protrusion of the housing that is U-shaped in longitudinal section.

Preferably, the bearing can be designed as a fluid or magnetic bearing.

In order to facilitate the axial displacement of the impellor, it is preferably provided that the housing has a zone that can be compressed and expanded in the axial direction on both sides of the respective radial strutting, which allows an axial and resilient displacement of the radial strutting together with the associated bearing.

The compressible and expandable zones may be formed, for example, as indentations or constrictions surrounding the outside of the housing, which are arranged on both sides of the protrusion caused by the radial strutting.

In order to synchronize the change in the direction of ejection of the blood pump with the heartbeat, it is preferably provided that the blood pump comprises a control device to which ECG signals can be supplied and which interacts with a flow directing means actuator in order to guide the ejected blood to either the first or second axial end of the housing in dependence on the ECG signals. Specifically, the control device may be configured to perform intra-aortic counterpulsation. During the diastole determined from the ECG signals, the flow directing means is guided in the direction of the second end of the housing and during the systole determined from the ECG signals, it is guided in the direction of the first end of the housing. In this case, the switch preferably takes place with each heartbeat.

Alternatively, it can be provided that the pump is operated over a longer period of time, i.e. over several heartbeats, without changing direction, for example in accordance with oxygen saturation of the blood. As a result, the blood is increasingly pumped in the direction of the upper half of the body or in the direction of the lower half of the body.

In order to reduce the risk of thrombosis and to enable optimized flow behavior of the blood, it is preferably provided that the impellor body is designed as a flexible hollow body, which is connected to a gas supply or liquid supply and discharge line, in order to increase or decrease the diameter of the impellor body in a controlled manner. If the impellor body preferably has a conical surface that delimits the flow channel on the inside, inflation or filling of the impellor body causes an increase in the cone angle, which produces a steeper inflow surface. If gas or liquid is discharged from the hollow body, the opening angle of the cone is reduced, so that blood flows at a flatter flow angle along the impellor body. A small cone angle leads to a reduction in negative mechanical influences on cell components of the blood.

The change in the diameter of the impellor body additionally allows a change in the volume flow that is pumped in the direction of the upper or lower half of the body. An increase in the diameter of the impellor body leads to a decrease in the pumped blood volume per unit of time with the impellor rpm remaining the same. A decrease in the diameter of the impellor body leads to an increase in the pumped blood volume per unit of time with the impellor rpm remaining the same.

It is preferably provided here that the blood pump comprises a control device to which sensor or ECG signals can be supplied and which is designed to increase or decrease the diameter of the impellor body as a function of the sensor or ECG signals.

For example, if the ECG shows an ST-elevation, which indicates ischemia, the diameter of the impellor body is decreased, allowing increased blood flow in the direction of the upper and lower body halves and remedying the lack of blood flow.

The sensor signals may represent measurements of a physiological parameter representative of the degree of blood flow to a human body or a body region.

Preferably, the flexible hollow body is made of silicone, PU, polyamide, PET or PEBAX.

Preferably, the flexible hollow body may be provided with a nitinol framework to ensure uniform expansion of the hollow body.

BRIEF DESCRIPTION OF THE DRAWINGS

The blood pump according to the invention is explained in more detail below with reference to exemplary embodiments schematically illustrated in the drawing.

FIG. 4 shows a detailed view of the second embodiment of the invention.

DETAILED DESCRIPTION

Figure 1:
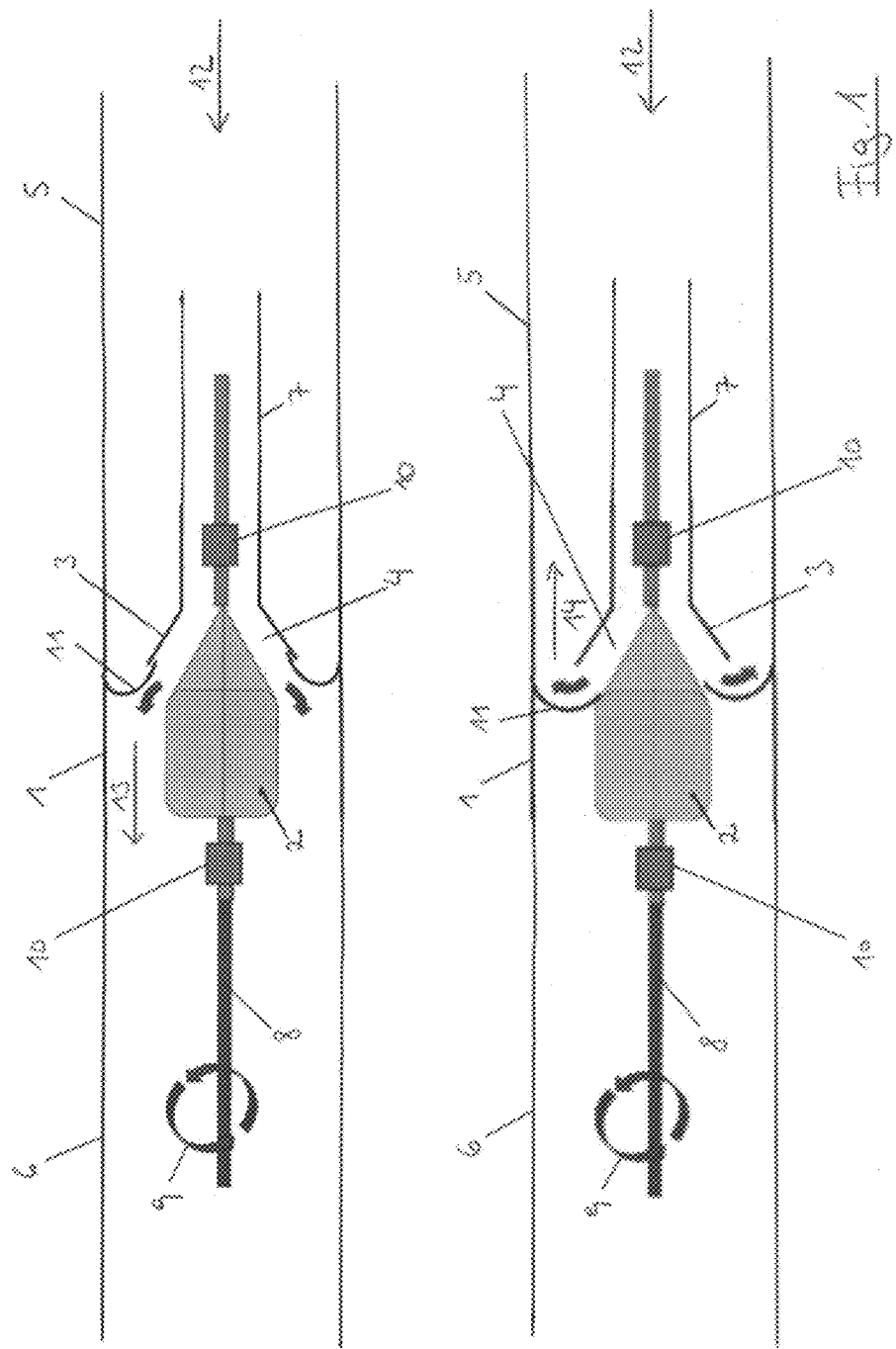
FIG. 1 shows the blood pump according to the invention according to a first embodiment of the invention.

In FIG. 1, the blood pump according to the invention is shown both during systole (FIG. 1 top) and during diastole (FIG. 1 bottom). The housing of the blood pump is denoted by the reference number 1. Arranged within the housing 1 is a rotatably mounted impeller, which comprises an inner impellor body 2 and an impellor casing 3. Between the impellor body 2 and the impellor casing 3, an annular flow channel 4 is formed, which extends from an intake side facing the first axial end 5 of the housing 1 to a discharge side facing the second axial end 6 of the housing 1 and widens radially outward. Impellor casing 3 is connected to an intake tube 7, through which sucked blood is guided to flow channel 4.

The impellor body 2 can be driven to rotate by means of a flexible drive shaft 8. The rotational movement is indicated by the arrow marked 9. The drive shaft 8 is held in a bearing 10 on both sides of the impellor body 2.

If the impellor body 2 is set in rotation, the impellor blades (not shown) arranged on the conical region of the impellor body 2 generate a blood flow, blood being sucked in the direction of the arrow 12 through the intake tube 7 into the flow channel 4 located between the impellor casing 3 and the impellor body 2. Arranged on the annular opening of the flow channel 4, which is delimited on the outside by the edge of the impellor casing 3 and on the inside by the impellor body 2, is a flow directing means 11 protruding inwards from the housing 1. In the example shown, the flow directing means is designed as an annular lip, which can be displaced by means of an actuating element (not shown) between a first position shown at the top in FIG. 1 and a second position shown at the bottom in FIG. 1.

In FIG. 1 (top), the flow directing means 11 is oriented in such a way that it rests against the impellor casing 3, as a result of which the blood flows out of the annular opening in the direction of the arrow 13. In FIG. 1 (bottom), the flow directing means 11 rests against the impellor body 2, as a result of which the blood coming out of the annular opening is diverted in the direction of the arrow 14 and flows to the first axial end 5 of the housing 1.

Figure 2:
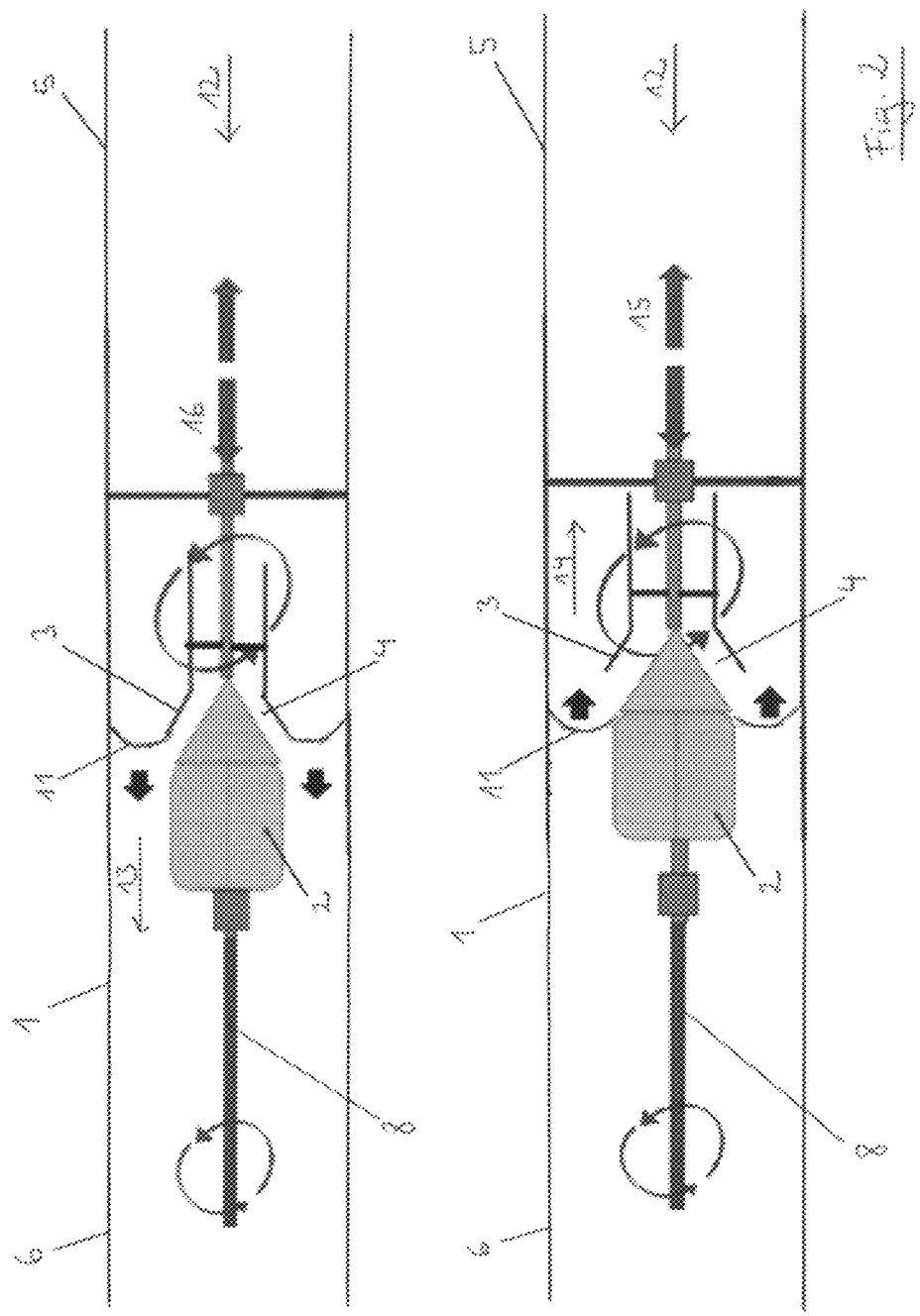
FIG. 2 shows the blood pump according to the invention according to a second embodiment of the invention.

FIG. 2 (top) shows the blood pump according to the invention according to a second embodiment of the invention during systole. FIG. 2 (bottom) shows the blood pump according to the invention according to a second embodiment of the invention during diastole. The embodiment shown in FIG. 2 largely corresponds to the embodiment shown in FIG. 1, but has the following differences.

The flow directing means 11 is mounted immovably on the inside of the housing 1, and the impellor, i.e. the impellor body 2 and the impellor casing 3, are mounted so as to be displaceable in the axial direction within the housing 1. In order to guide the blood flowing into the housing 1 of the pump in the direction of the arrow 12 selectively in the direction of the first axial end 5 or the second axial end 6 of the housing 1, the impellor is moved either according to the arrow 15 in the direction of the first axial end 5 or according to the arrow 16 in the direction of the second axial end 6.

If the impellor body 2 and the impellor casing 3 are displaced in the direction of the second axial end 6 of the housing 1 according to the arrow 16, the flow directing means 11 comes to rest on the impellor casing 3, as a result of which the blood flows in the direction of the arrow 13 (FIG. 2, top). If, on the other hand, the impellor body 2 and the impellor casing 3 are displaced in the direction of the first axial end 5 of the housing 1 in accordance with the arrow 15, the flow directing means 11 abuts the impellor body 2, as a result of which the blood flows from the flow directing means 11 in the direction of the arrow 14 to the first axial end 5 of the housing 1 (FIG. 2, bottom).

Figure 3:
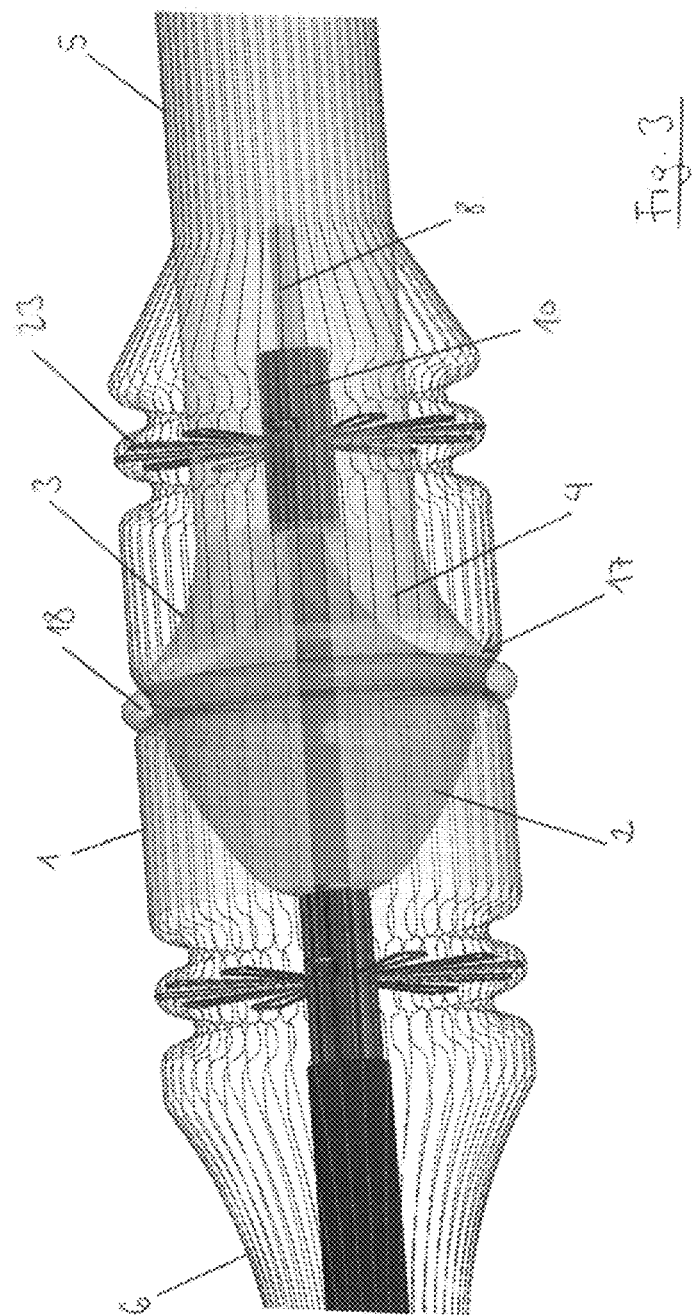
FIG. 3 shows a detailed view of the first embodiment of the invention with a flow directing means formed by an annular, flexible lip.

FIG. 3 shows a detailed view of the first embodiment of the invention, wherein the flow directing means is formed by an annular constriction 17 of the housing 1. The constriction 17 interacts with an actuating member 18, which is designed as an annular inflatable hollow body lying in the constriction 17.

In order to bring about a blood flow, indicated by arrow 14, in the direction of the first axial end 5 of the housing 1, the hollow body 18 is filled with gas or liquid, as a result of which the constriction 17 constricts and comes into contact with the inner edge of the annular opening of the flow channel 4, i.e. with the impellor body 2, as a result of which the blood flow is diverted in the direction of the first axial end 5 of the housing. If gas or liquid is discharged from the hollow body 18, the inner diameter of the constriction 17 increases again, so that it comes into contact with the impellor casing 3 and releases blood flow in the direction of the second axial end 6 of the housing 1.

In order to fix the drive shaft 8 in the housing 1 of the blood pump, it is rotatably held on both sides of the impellor in a bearing 10, wherein the bearing 10 is supported on the inside of the housing 1 by means of a radial strutting 23.

FIG. 4 shows a detailed view of the second embodiment of the invention, i.e. that embodiment in which the impellor is accommodated in an axially displaceable manner in the housing 1 of the pump. The impellor casing 3 is connected to the intake tube 7 via a telescopic connection 19, which can be extended in the axial direction of the pump. During a movement of the impellor casing 3 directed in the direction of the second axial end 6 of the housing 1, the telescopic connection 19 lengthens in the direction of the arrow 20, as a result of which the tensile force acting on the intake tube 7 is reduced and the displacement of the impellor casing 3 relative to the intake tube 7 is facilitated.

The pump shown in FIG. 4 comprises a radial strutting 23 that extends from the bearing 10 toward the inside of the housing 1, where the strutting 23 is held in an annular protrusion 21. In order to allow a resilient translational movement of the strutting 23, the housing 1 has axially compressible and expandable zones 22 on both sides of the protrusion 21, each of which is formed by an annular constriction.

The invention claimed is:

1. A blood pump for supporting cardiac performance, comprising:
   a stent-like housing having a first axial end and a second axial end;
   a pump rotor mounted rotatably in the housing;
   a flexible drive shaft configured to be coupled to a motor to drive the pump rotor to rotate; and
   a flow directing arrangement arranged downstream of the pump rotor in order to selectively direct the blood conveyed by the pump rotor alternately to the first axial end and or to the second axial end of the stent-like housing while maintaining a direction of rotation of the pump rotor, the first axial end being opposite the second axial end;
   wherein blood is sucked in on an intake side of the pump rotor through an intake tube of the blood pump and is ejected on a discharge side of the pump rotor.

2. The blood pump according to claim 1, wherein the pump rotor comprises an impellor.

3. The blood pump according to claim 2, wherein:
   the impellor comprises an inner impellor body, the inner impellor body carrying a multitude of impellor blades and being surrounded by a substantially conical impellor casing so that, between the impellor casing and the impellor body, an annular flow channel is formed which widens radially outwards in the direction of flow from the intake side to the discharge side, in which the impellor blades are arranged;
   the intake tube is connected to the impellor casing on the intake side and the flow channel has an annular opening on the discharge side, the outer edge of which is formed by the impellor casing and the inner edge of which is formed by the impellor body; and
   the housing comprises the flow directing arrangement, which interacts selectively with the inner or the outer edge of the annular opening, to guide the blood emerging from the flow channel of the impellor either to the first axial end of the housing or to the second axial end of the housing.

4. The blood pump according to claim 3, wherein the flow directing arrangement is displaceably supported between a first and a second position, the flow directing arrangement interacting with the outer edge of the annular opening in the first position and with the inner edge of the annular opening in the second position.

5. The blood pump according to claim 4, wherein the flow directing arrangement is formed by an annular, flexible lip.

6. The blood pump according to claim 3, wherein the impellor is slidably supported in the axial direction of the housing between a first and a second position, wherein the flow directing means interacts with the outer edge of the annular opening in the first position and with the inner edge of the annular opening in the second position.

7. The blood pump according to claim 1, wherein the blood pump comprises a control device to which ECG signals can be supplied and which cooperates with a flow directing means actuator in order to guide the ejected blood to either the first or second axial end of the housing depending on the ECG signals.

8. The blood pump according to claim 3, wherein the impellor body is configured as a flexible hollow body that is connected to a gas or liquid supply and discharge line in order to increase or decrease the diameter of the impellor body in a controlled manner.

9. The blood pump according to claim 8, wherein the blood pump comprises a control device to which sensor or ECG signals can be supplied and which is configured to increase or decrease the diameter of the impellor body depending on the sensor or ECG signals.

10. A blood pump for supporting cardiac performance, comprising:
    a stent-like housing having a first axial end and a second axial end;
    a pump rotor mounted rotatably in the housing;
    a flexible drive shaft configured to be coupled to a motor to drive the pump rotor to rotate; and
    a flow directing arrangement arranged downstream of the pump rotor in order to selectively direct the blood conveyed by the pump rotor to the first or to the second axial end of the housing while maintaining the direction of rotation of the pump rotor;
    wherein blood is sucked in on an intake side of the pump rotor through an intake tube of the blood pump and is ejected on a discharge side of the pump rotor;
    wherein the pump rotor comprises an impellor;
    wherein:
      the impellor comprises an inner impellor body, the inner impellor body carrying a multitude of impellor blades and being surrounded by a substantially conical impellor casing so that, between the impellor casing and the impellor body, an annular flow channel is formed which widens radially outwards in the direction of flow from the intake side to the discharge side, in which the impellor blades are arranged;
      the intake tube is connected to the impellor casing on the intake side and the flow channel has an annular opening on the discharge side, the outer edge of which is formed by the impellor casing and the inner edge of which is formed by the impellor body; and
      the housing comprises the flow directing arrangement, which interacts selectively with the inner or the outer edge of the annular opening, to guide the blood emerging from the flow channel of the impellor either to the first axial end of the housing or to the second axial end of the housing;
    wherein the flow directing arrangement is displaceably supported between a first and a second position, the flow directing arrangement interacting with the outer edge of the annular opening in the first position and with the inner edge of the annular opening in the second position;
    wherein the flow directing arrangement is formed by an annular, flexible lip; and
    wherein a pneumatically or hydraulically actuatable actuating member is provided, which interacts with the flow directing arrangement to displace the flow directing arrangement between the first and the second position.

11. The blood pump according to claim 10, wherein the pneumatically or hydraulically actuatable actuating member is formed by an annular hollow body which is connected to a gas supply or liquid supply and discharge line in order to increase or decrease the degree of filling of the hollow body in a controlled manner.

12. The blood pump according to claim 11, wherein the intake tube and the impellor casing are connected to each other so as to be displaceable in the axial direction of the housing.

13. A blood pump for supporting cardiac performance, comprising:
- a stent-like housing having a first axial end and a second axial end;
- a pump rotor mounted rotatably in the housing;
- a flexible drive shaft configured to be coupled to a motor to drive the pump rotor to rotate; and
- a flow directing arrangement arranged downstream of the pump rotor in order to selectively direct the blood conveyed by the pump rotor to the first or to the second axial end of the housing while maintaining the direction of rotation of the pump rotor;
- wherein blood is sucked in on an intake side of the pump rotor through an intake tube of the blood pump and is ejected on a discharge side of the pump rotor;
- wherein the flexible drive shaft is rotatably held on both sides of the pump rotor in a bearing that is fastened to the housing by means of a radial strutting.

14. The blood pump according claim 13, wherein the pump rotor comprises an impellor.

15. The blood pump according to claim 13, wherein the housing has an axially compressible and expandable zone on both sides of the respective radial strutting, which allows an axial and resilient displacement of the radial strutting together with the associated bearing.

* * * * *